(No Model.)
J. F. THEURER.
CARAMELIZED EXTRACT OF MALT AND PROCESS OF MAKING SAME.
No. 541,300. Patented June 18, 1895.
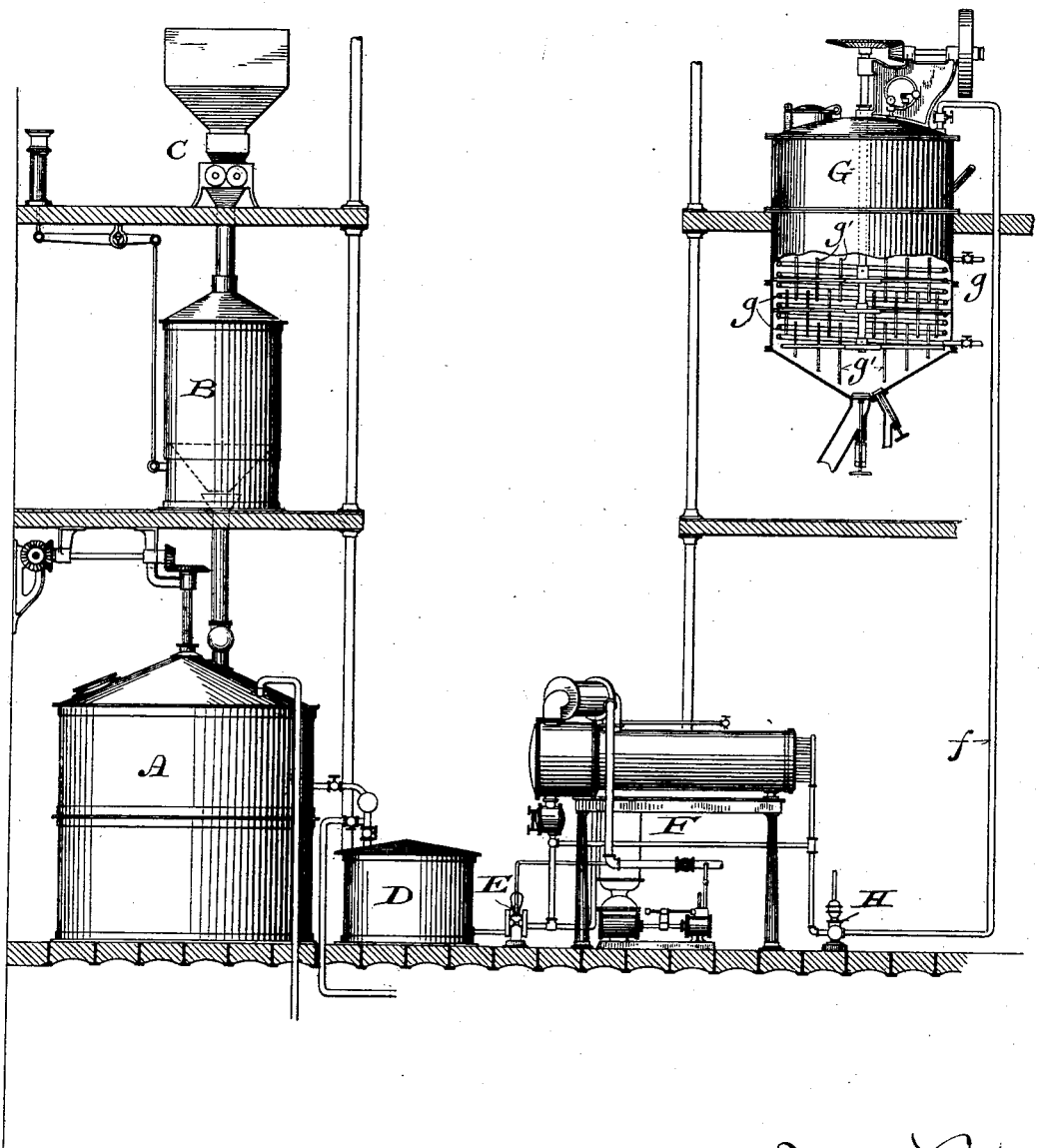

UNITED STATES PATENT OFFICE.

JACOB F. THEURER, OF MILWAUKEE, WISCONSIN.

CARAMELIZED EXTRACT OF MALT AND PROCESS OF MAKING SAME.

SPECIFICATION forming part of Letters Patent No. 541,300, dated June 18, 1895.

Application filed June 5, 1893. Serial No. 476,566. (No specimens.)

*To all whom it may concern:*

Be it known that I, JACOB F. THEURER, of Milwaukee, in the county of Milwaukee and State of Wisconsin, have invented certain new and useful Improvements in Extracts for Beverages and Process of Making the Same; and I do hereby declare that the following is a full, clear, and exact description of the invention, which will enable others skilled in the art to which it pertains to make and use the same, reference being had to the accompanying drawing, and to the letters of reference marked thereon, which forms a part of this specification.

My invention consists in a coloring and flavoring extract for liquors, and in a novel process of making the same, as hereinafter set forth.

The extract may be described as a clear and stable compound, having a pleasant aromatic flavor, slightly sweet, free from any burned, bitter or empyreumatic taste or odor, and of a rich, reddish brown color.

In general terms the preparation may be defined as a caramelized extract of malt wort, though it is to be distinguished from all extracts based upon or containing ordinary cane-sugar-caramel, and from any extract containing burned matter or having a burned taste, it being a distinguishing characteristic of my preparation that none of its constituent elements or ingredients are burned or scorched. The preparation is further differentiated from others in that in its normal condition it is not fermentable, but on the contrary is a preservative, and will not mold or become offensive in odor, though fermentable when sufficiently diluted.

In order that my invention may be the better availed of and practiced by the public, I have represented and will now describe a simple and suitable apparatus for the purpose.

Referring to the accompanying drawing, A represents a mash tub or steeping kettle; B, a scale hopper by which the malt or other grain from which the extract is made is weighed into the mash tub, and C a hopper and pair of crushing rollers by which the malt or other grain is crushed and from which it passes to the scale hopper B.

The foregoing devices are such as are commonly employed in breweries in the manufacture of beer.

D is a closed vessel or tank into which the wort is drawn from the mash tub A, and from which it is forced by a pump E into a vacuum evaporating apparatus F, such as is commonly employed for the evaporation of saccharine liquids in the manfacture of sugar.

G represents a closed vessel provided inside with a steam coil $g$, or with other suitable means for heating the contents of said vessel under pressure. It is connected with the vacuum evaporator by a pipe $f$.

H represents a pump for forcing the condensed liquid extract from the evaporator F into the vessel G, which is preferably provided inside with stirrers or agitators $g'$.

In carrying out my process by means of the foregoing apparatus, the malt or other grain from which the extract is made, is steeped in the kettle or mash tub A, and the wort thus produced, the same as in the manufacture of beer, is drawn therefrom into the tank D. From the tank D it is forced by the pump E into the evaporator F. In its passage through the evaporator, in which a vacuum is maintained in the usual manner, it is subjected to a sufficient degree of heat to reduce it to the consistency of a thick sirup. From the evaporator it is forced by the pump H through pipe $f$ into the vessel G, in which it is subjected to heat under pressure for a sufficient time to impart to the extract or sirup a rich brown color, and an aromatic or slightly acid flavor. From the vessel G the extract is drawn, ready for use, or for bottling or packing for shipment.

The time required for production or treatment of the extract will vary according to the nature and condition of materials, the temperature, and the degree of pressure adopted.

In practice I find it advantageous to employ a pressure of from twenty-five to thirty pounds, and a temperature of from 240° to 250° Fahrenheit, under which conditions the treatment should be continued in vessel G for about two hours. Both the pressure and the temperature may vary within somewhat wide limits, but it will be found advantageous to maintain a pressure in excess of that merely due to the working temperature, and said temperature should never be high enough to burn or scorch the extract or any of its constituents. The pressure due to increase of temperature within closed vessel G may be augmented through the aid of pump H or otherwise, until any desired limit is reached.

A peculiarity and an essential feature of my process resides in the employment of pressure in the heating vessel G, such pressure enabling me to attain the desired chemical changes and reactions at a materially lower temperature than would otherwise be possible, and at a temperature so low that burning or scorching is impossible.

Heretofore, caramel, prepared by subjecting cane sugar (saccharose) to protracted heating at a temperature of from 180° to 200° centigrade (356° to 392° Fahrenheit) has been commonly used for coloring liquors. So too, it has been proposed to color and flavor porter by adding thereto malt wort, evaporated to an extract, and then partially torrefied in an iron pan. Both these former modes of treatment have been carried on at atmospheric pressure, in open vessels, and as a consequence a bitter, burned taste has resulted, because in order to caramelize cane sugar or saccharine extract at atmospheric pressure, a high temperature must necessarily be employed. On the other hand, such heating, say from 360° to 392° Fahrenheit, results inevitably in giving the product an objectionable bitter, burned taste. If a lower temperature without any pressure should be adopted, very slight caramelization would take place, if any, and no product would be obtained fit for the purpose in view. All these objectionable qualities and effects are avoided by treatment under pressure, whereby I am enabled to effect the necessary changes at a temperature lower than is practicable without pressure, and so low that burning or scorching cannot occur.

Having thus described my invention, I claim—

1. A caramelized extract for flavoring or coloring liquors, consisting of a concentrated extract of malt wort, having a pleasant aromatic and slightly sweet taste and a dark brown color, but devoid of empyreumatic taste or odor.

2. The process of producing an extract for coloring or flavoring liquors, which consists in evaporating wort, and subjecting the wort, thus condensed, to combined heat and pressure, substantially as set forth.

3. The process of producing flavoring and coloring extracts, which consists in the following steps: first, producing wort from barley or other grain; second, concentrating the wort by evaporation *in vacuo;* and third, subjecting the concentrated wort to the conjoint action of heat and pressure in a closed vessel.

In testimony that I claim the foregoing as my own I affix my signature in presence of two witnesses.

JACOB F. THEURER.

Witnesses:
CHAS. L. GOSS,
A. W. EMERY.